United States Patent
Gong et al.

(10) Patent No.: US 11,643,957 B2
(45) Date of Patent: May 9, 2023

(54) SYSTEMS AND METHODS FOR VIRTUALLY DETERMINING FUEL SULFUR CONCENTRATION

(71) Applicant: CUMMINS EMISSION SOLUTIONS INC., Columbus, IN (US)

(72) Inventors: Jinqian Gong, Columbus, IN (US); Durvesh Ramesh Pathak, Columbus, IN (US); Changsheng C. Su, Columbus, IN (US); Gautam Sharma, Columbus, IN (US); Yuanzhou Xi, Verona, WI (US)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

(21) Appl. No.: 17/778,058

(22) PCT Filed: Nov. 22, 2019

(86) PCT No.: PCT/US2019/062728
§ 371 (c)(1),
(2) Date: May 19, 2022

(87) PCT Pub. No.: WO2021/101556
PCT Pub. Date: May 27, 2021

(65) Prior Publication Data
US 2022/0412239 A1  Dec. 29, 2022

(51) Int. Cl.
*F01N 3/10* (2006.01)
*F01N 3/20* (2006.01)
*B01D 53/94* (2006.01)

(52) U.S. Cl.
CPC .......... *F01N 3/208* (2013.01); *B01D 53/944* (2013.01); *B01D 53/9418* (2013.01);
(Continued)

(58) Field of Classification Search
CPC .... B01F 53/944; B01F 53/9495; F01N 3/208; F01N 3/166; F01N 3/2066; F01N 3/20;
(Continued)

(56) References Cited

U.S. PATENT DOCUMENTS 9,067,191 B2 *  6/2015  Seki .......................... B01J 21/08
9,181,842 B2 * 11/2015  Umemoto ............... F01N 3/085
(Continued)

FOREIGN PATENT DOCUMENTS

WO    WO-2017/023766 A1    2/2017

OTHER PUBLICATIONS

PCT International Search Report dated Feb. 3, 2020 in PCT/US2019/062728.
PCT Written Opinion in PCT/US2019/062728 dated Feb. 3, 2020.
First Office Action issued in Indian Patent Application No. 202247028820 dated Jul. 11, 2022.

*Primary Examiner* — Audrey B. Walter
*Assistant Examiner* — Dapinder Singh
(74) *Attorney, Agent, or Firm* — Foley & Lardner LLP (57) ABSTRACT

A control module for an aftertreatment system that includes a selective catalytic reduction (SCR) catalyst and an oxidation catalyst, comprises a controller configured to be operatively coupled to the aftertreatment system. The controller is configured to determine an actual SCR catalytic conversion efficiency of the SCR catalyst. The controller determines an estimated SCR catalytic conversion efficiency based on a test sulfur concentration selected by the controller. In response to the estimated SCR catalytic conversion efficiency being within a predefined range, the controller sets the test sulfur concentration as a determined sulfur concentration in a fuel provided to the engine. The controller generates a sulfur concentration signal indicating the determined sulfur.

20 Claims, 7 Drawing Sheets

(52) U.S. Cl.
CPC ......... *B01D 53/9495* (2013.01); *F01N 3/106* (2013.01); *F01N 2900/08* (2013.01); *F01N 2900/1602* (2013.01); *F01N 2900/1806* (2013.01)

(58) Field of Classification Search
CPC ........ F01N 9/00; F01N 11/00; F01N 2900/08; F01N 2900/1602; F01N 2900/1806; F01N 2900/04; F01N 2900/00; F01N 2900/0408; F01N 2900/06; F01N 2900/14; F01N 2900/1402; F01N 2900/1612; F01N 2610/02; Y02T 10/12; Y02T 10/40
See application file for complete search history.

(56) References Cited

U.S. PATENT DOCUMENTS

| | | |
|---|---|---|
| 2007/0065341 A1 | 3/2007 | Asanuma |
| 2009/0071125 A1* | 3/2009 | Yoshida ................ F01N 3/0885 60/299 |
| 2009/0171553 A1* | 7/2009 | Audouin ............... F02D 41/028 60/276 |
| 2010/0024393 A1 | 2/2010 | Chi et al. |
| 2010/0275583 A1 | 11/2010 | Farrell et al. |
| 2013/0213008 A1 | 8/2013 | Kumar et al. |
| 2014/0331644 A1 | 11/2014 | Kumar et al. |
| 2015/0101310 A1 | 4/2015 | Kowalkowski et al. |

* cited by examiner

SYSTEMS AND METHODS FOR VIRTUALLY DETERMINING FUEL SULFUR CONCENTRATION

CROSS-REFERENCE TO RELATED APPLICATIONS

This application is a U.S. national stage of PCT Application No. PCT/US2019/062728, filed Nov. 22, 2019, the contents of which are incorporated herein by reference in their entirety.

TECHNICAL FIELD

The present disclosure relates generally to aftertreatment systems for use with internal combustion (IC) engines.

BACKGROUND

Exhaust aftertreatment systems are used to receive and treat exhaust gas generated by internal combustion engines. Generally, exhaust gas aftertreatment systems comprise any of several different components to reduce the levels of harmful exhaust emissions present in exhaust gas. For example, certain exhaust gas aftertreatment systems for diesel-powered IC engines comprise an oxidation catalyst for oxidizing carbon monoxide (CO) or unburnt hydrocarbons, and may also be used to increase a temperature of the exhaust gas for regenerating a filter disposed downstream of the oxidation catalyst. Aftertreatment systems may also include a selective catalytic reduction (SCR) system for decomposing constituents of the exhaust gas such as nitric oxides ($NO_x$) gases included in the exhaust gas. The fuel being combusted by some IC engines may include a high sulfur content, which may deteriorate the oxidation catalyst and/or the SCR catalyst. Determining an amount of sulfur concentration in the fuel is beneficial for determining sulfation of the SCR catalyst (i.e., absorption/adsorption of sulfur species on the SCR catalyst), and to schedule regeneration events.

SUMMARY

Embodiments described herein relate generally to systems and methods for virtually determining a sulfur concentration in a fuel provided to an engine. In particular, systems and methods described herein relate to aftertreatment systems that include a controller configured to determine an actual SCR catalytic conversion efficiency (CE) of a SCR catalyst, determine an estimated SCR catalytic CE based on a test sulfur concentration, and set the test sulfur concentration as a determined sulfur concentration in the fuel based on how well the estimated SCR catalytic CE correlates to the actual SCR catalytic CE.

In some embodiments, a controller for an aftertreatment system that is configured to treat constituents of an exhaust gas produced by an engine and that comprises a selective catalytic reduction (SCR) catalyst and an oxidation catalyst, the controller being configured to be operatively coupled to the aftertreatment system, the controller configured to: determine an actual SCR catalytic conversion efficiency of the SCR catalyst, determine an estimated SCR catalytic conversion efficiency based on a test sulfur concentration selected by the controller, in response to the estimated SCR catalytic conversion efficiency being within a predefined range, set the test sulfur concentration as a determined sulfur concentration in a fuel provided to the engine, and generate a sulfur concentration signal indicating the determined sulfur concentration in the fuel.

In some embodiments, an aftertreatment system for treating constituents of an exhaust gas produced by an engine, comprises: an oxidation catalyst; a SCR catalyst disposed downstream of the oxidation catalyst; and a controller configured to: determine an actual SCR catalytic conversion efficiency of the SCR catalyst, determine an estimated SCR catalytic conversion efficiency based on a test sulfur concentration selected by the controller, in response to the estimated SCR catalytic conversion efficiency being within a predefined range, set the test sulfur concentration as a determined sulfur concentration in a fuel provided to the engine, and generate a sulfur concentration signal indicating the determined sulfur concentration in the fuel.

In some embodiments, a controller based method for estimating a sulfur concentration of a fuel provided to an engine that combusts the fuel and generates an exhaust gas communicated to an aftertreatment system, the method comprises: determining, by the controller, an actual SCR catalytic conversion efficiency of the SCR catalyst; determining, by the controller, an estimated SCR catalytic conversion efficiency based on a test sulfur concentration selected by the controller; in response to the estimated SCR catalytic conversion efficiency being within a predefined range, setting, by the controller, the test sulfur concentration as a determined sulfur concentration in the fuel; and generating, by the controller, a sulfur concentration signal indicating the determined sulfur concentration in the fuel.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF DRAWINGS

The foregoing and other features of the present disclosure will become more fully apparent from the following description and appended claims taken in conjunction with the accompanying drawings. Understanding that these drawings depict only several implementations in accordance with the disclosure and are therefore not to be considered limiting of its scope, the disclosure will be described with additional specificity and detail through use of the accompanying drawings.

Reference is made to the accompanying drawings throughout the following detailed description. In the drawings, similar symbols typically identify similar components unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

Embodiments described herein relate generally to systems and methods for virtually determining a sulfur concentration in a fuel provided to an engine. In particular, systems and methods described herein relate to aftertreatment systems that include a controller configured to determine an actual SCR catalytic conversion efficiency (CE) of a SCR catalyst, determine an estimated SCR catalytic CE based on a test sulfur concentration, and set the test sulfur concentration as the sulfur concentration in the fuel based on how well the estimated SCR catalytic CE correlates to the actual SCR catalytic CE.

Aftertreatment systems may include an oxidation catalyst for decomposing CO or hydrocarbons included in an exhaust gas flowing therethrough. Aftertreatment systems may also include a SCR catalyst for decomposing $NO_x$ gases included in the exhaust gas. Conventional aftertreatment systems are designed with the expectation that they will be operated with a fuel (e.g., a diesel fuel) which has a low sulfur concentration, for example, a sulfur concentration of 15 ppm or less. However, there is a potential that fuels (e.g., diesel fuels) with a higher concentration of sulfur may be used. This can lead to a reversible deterioration of the oxidation catalyst and SCR catalyst functions in particular due to accumulation of sulfur species on the oxidation catalyst and the SCR catalyst. In some instances, the sulfur concentration in the fuel can be greater than 1,500 ppm. Differentiating between various fuel sulfur concentrations is beneficial in scheduling regeneration events, controlling reductant insertion, and/or other parameters of the aftertreatment system. Sulfur sensors for determining fuel sulfur concentrations are not readily available making it difficult to determine fuel sulfur concentration in an unknown fuel sample.

In contrast, various embodiments of the systems and methods described herein may provide one or more benefits including, for example: (1) enabling virtual determination of fuel sulfur concentration without using a physical sensor; (2) protecting aftertreatment system from corrosion by disabling reductant insertion based on fuel sulfur concentration; (3) reducing social concerns by disabling stationary regeneration of the SCR catalyst when very high sulfur concentration fuel is detected; and (4) protecting the aftertreatment system from accelerated hydrothermal aging due to sulfur poisoning, therefore increasing the life of the aftertreatment system.

Figure 1:
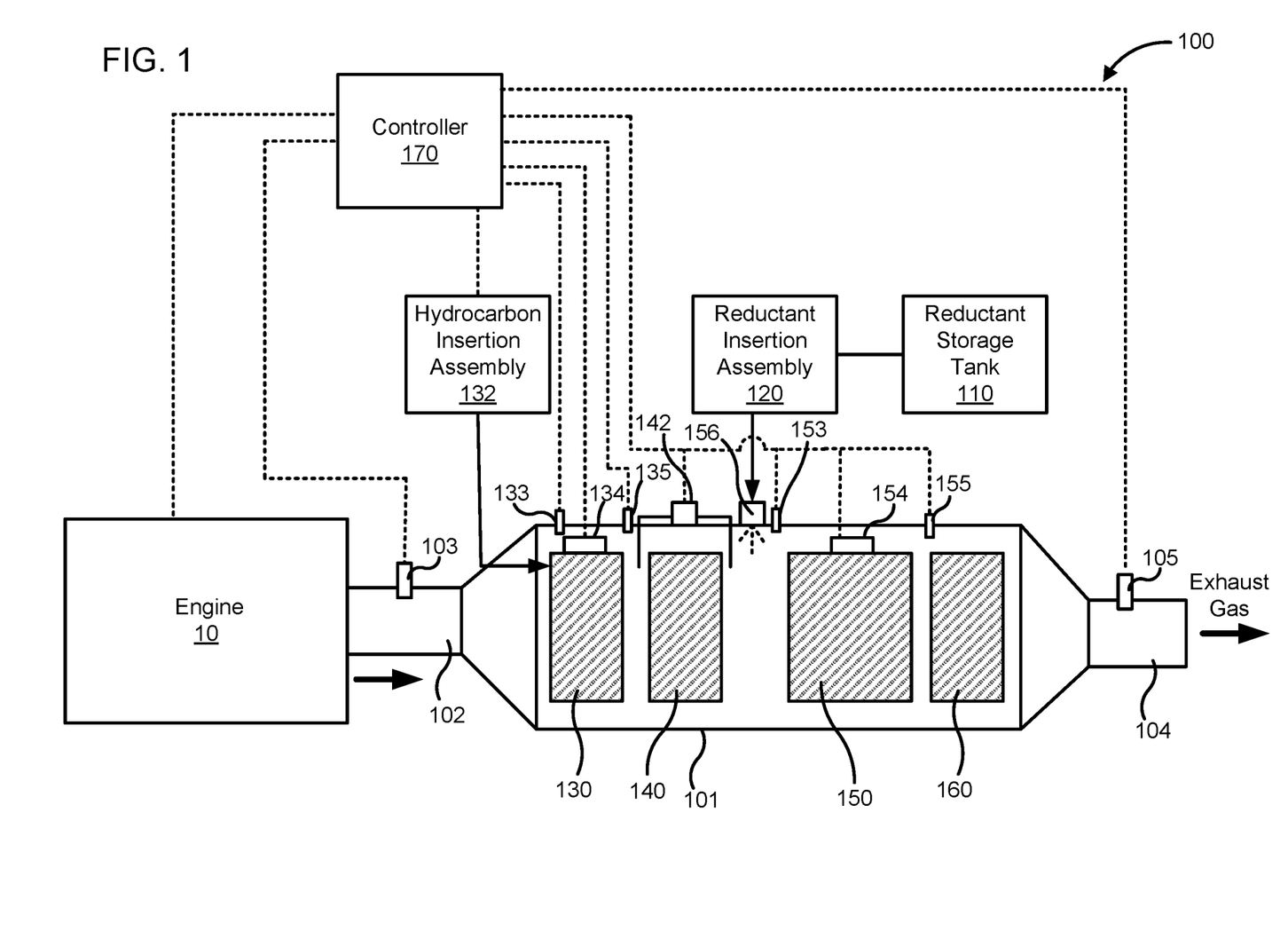
FIG. 1 is a schematic illustration of an aftertreatment system, according to an embodiment.

FIG. 1 is a schematic illustration of an aftertreatment system 100, according to an embodiment. The aftertreatment system 100 is configured to receive an exhaust gas from an engine 10 (e.g., a diesel engine, a gasoline engine, a natural gas engine, a dual fuel engine, a biodiesel engine, an E-85 engine, or any other suitable engine) and reduce constituents of the exhaust gas such as, for example, NO gases, CO, hydrocarbons, etc. In some embodiments, the fuel consumed by the engine 10 may have a high sulfur concentration (e.g., a high sulfur concentration diesel fuel), for example, greater than 15 ppm, 50 ppm, 100 ppm, 500 ppm, 1,000 ppm, 1,500 ppm, or even higher. The aftertreatment system 100 may include a reductant storage tank 110, a reductant insertion assembly 120, a housing 101, an oxidation catalyst 130, a filter 140, a SCR catalyst 150, and a controller 170. In some embodiments, the aftertreatment system 100 may also include a hydrocarbon insertion assembly 132, and an ammonia oxidation ($AMO_x$) catalyst 160.

The housing 101 defines an internal volume within which the oxidation catalyst 130, the filter 140, the SCR catalyst 150, and the AMOK catalyst 160 are disposed. The housing 101 may be formed from a rigid, heat-resistant and corrosion-resistant material, for example stainless steel, iron, aluminum, metals, ceramics, or any other suitable material. The housing 101 may have any suitable cross-section, for example circular, square, rectangular, oval, elliptical, polygonal, or any other suitable shape.

An inlet conduit 102 is fluidly coupled to an inlet of the housing 101 and structured to receive exhaust gas from the engine 10 and communicate the exhaust gas to an internal volume defined by the housing 101. Furthermore, an outlet conduit 104 may be coupled to an outlet of the housing 101 and structured to expel treated exhaust gas into the environment (e.g., treated to remove particulate matter such as soot by the filter 140 and/or reduce constituents of the exhaust gas such as $NO_x$ gases, CO, unburnt hydrocarbons, etc. included in the exhaust gas).

A first sensor 103 may be positioned in the inlet conduit 102. The first sensor 103 may comprise a $NO_x$ sensor configured to measure an inlet $NO_x$ amount of $NO_x$ gases entering the aftertreatment system 100 and may include a physical sensor or a virtual sensor. In various embodiments, a temperature sensor, a pressure sensor, an oxygen sensor or any other sensor may also be positioned in the inlet conduit 102 so as to determine one or more operational parameters of the exhaust gas flowing through the aftertreatment system 100.

A second sensor 105 may be positioned in the outlet conduit 104. The second sensor 105 may comprise a second $NO_x$ sensor configured to determine an outlet $NO_x$ amount of $NO_x$ gases exiting the aftertreatment system 100 after passing through the SCR catalyst 150. In other embodiments, the second sensor 105 may comprise a particulate matter sensor configured to determine an amount of particulate matter (e.g., soot included in the exhaust gas exiting the filter 140) in the exhaust gas being expelled into the environment. In still other embodiments, the second sensor 105 may comprise an ammonia sensor configured to measure an amount of ammonia in the exhaust gas flowing out of the SCR catalyst 150, i.e., determine the ammonia slip. This may be used as a measure of determining a catalytic efficiency of the SCR catalyst 150, adjust an amount of reductant to be inserted into the SCR catalyst 150, and/or adjust a temperature of the SCR catalyst 150 so as to allow the SCR catalyst 150 to effectively use the ammonia for catalytic decomposition of the $NO_x$ gases included in the exhaust gas flowing therethrough. The ammonia oxide ($AMO_x$) catalyst 160 may be positioned downstream of the SCR catalyst 150 so as to decompose any unreacted ammonia in the exhaust gas downstream of the SCR catalyst 150.

The oxidation catalyst 130 is positioned downstream of the inlet conduit 102 and fluidly coupled thereto, so as to receive the exhaust gas therefrom. The oxidation catalyst 130 may be configured to decompose unburnt hydrocarbons and/or CO included in the exhaust gas. In particular embodiments, the oxidation catalyst 130 comprises a diesel oxidation catalyst. An oxidation catalyst inlet temperature sensor 133 may be positioned proximate to an inlet of the oxidation catalyst 130 and configured to determine an oxidation catalyst inlet temperature of the oxidation catalyst 130. Furthermore, an oxidation catalyst outlet temperature sensor 135 is positioned proximate to an outlet of the oxidation catalyst 130 and configured to determine an oxidation catalyst outlet temperature. The oxidation catalyst inlet and outlet temperatures may be used (e.g., by the controller 170) to determine an estimated oxidation catalyst bed temperature of the oxidation catalyst 130. In some embodiments, an oxidation catalyst heater 134 may be coupled to the oxidation catalyst 130 and configured to selectively heat the oxidation catalyst 130 to a predetermined temperature, for example, a low regeneration temperature (e.g., in a range of 350-500 degree Celsius) or a high regeneration temperature (e.g., equal to or greater than 550 degrees Celsius).

The filter 140 is disposed downstream of the oxidation catalyst 130 and configured to remove particulate matter (e.g., soot, debris, inorganic particles, etc.) from the exhaust gas. In various embodiments, the filter 140 may include a ceramic filter. In some embodiments, the filter 140 may include a cordierite filter that can, for example, be an asymmetric filter. In yet other embodiments, the filter 140 may be catalyzed.

Furthermore, the hydrocarbon insertion assembly 132 may be coupled to the housing 101 and configured to selectively insert hydrocarbons onto the oxidation catalyst 130. The oxidation catalyst 130 is formulated to catalyze ignition of the hydrocarbons when the oxidation catalyst 130 is heated to a high regeneration temperature (e.g., 550 degrees Celsius or higher). The regeneration temperature corresponds to a light-off temperature of the hydrocarbons which may be inserted into the oxidation catalyst 130 to increase a temperature of the exhaust gas to a de-soot temperature sufficient to burn off soot accumulated on the filter 140, i.e., regenerate the filter 140.

The SCR catalyst 150 is formulated to decompose constituents of the exhaust gas flowing therethrough in the presence of a reductant, as described herein. In some embodiments, the SCR catalyst 150 may include a selective catalytic reduction filter (SCRF). Any suitable SCR catalyst 150 may be used such as, for example, platinum, palladium, rhodium, cerium, iron, manganese, copper, vanadium based catalyst, any other suitable catalyst, or a combination thereof. In some embodiments, the SCR catalyst 150 may include a copper-zeolite catalyst, which are sensitive to sulfur poisoning. The SCR catalyst 150 may be disposed on a suitable substrate such as, for example, a ceramic (e.g., cordierite) or metallic (e.g., kanthal) monolith core which can, for example, define a honeycomb structure. A washcoat can also be used as a carrier material for the SCR catalyst 150. Such washcoat materials may comprise, for example, aluminum oxide, titanium dioxide, silicon dioxide, any other suitable washcoat material, or a combination thereof.

The exhaust gas (e.g., diesel exhaust gas) can flow over and/or about the SCR catalyst 150 such that any $NO_x$ gases included in the exhaust gas are further reduced to yield an exhaust gas that is substantially free of $NO_x$ gases. A SCR inlet temperature sensor 153 may be positioned proximate to an inlet of the SCR catalyst 150 and configured to determine an SCR inlet temperature of the SCR catalyst 150. Moreover, a SCR outlet temperature sensor 155 may be positioned proximate to an outlet of the SCR catalyst 150 and configured to determine a SCR outlet temperature of the SCR catalyst 150. The SCR inlet and outlet temperatures may be used (e.g., by the controller 170) to determine an estimated SCR catalyst bed temperature. In some embodiments, a SCR catalyst heater 154 may be coupled to the SCR catalyst 150 and configured to selectively heat the SCR catalyst 150 to a predetermined temperature, for example, to an operating temperature of SCR catalyst (e.g., greater than 250 degree Celsius), a low regeneration temperature (e.g., in a range of 350-500 degree Celsius) or a high regeneration temperature (e.g., equal to or greater than 550 degrees Celsius).

Although FIG. 1, shows only the oxidation catalyst 130, the filter 140, the SCR catalyst 150 and the MAO, catalyst 160 positioned within the internal volume defined by the housing 101, in other embodiments, a plurality of aftertreatment components may be positioned within the internal volume defined by the housing 101 in addition to the oxidation catalyst 130, the filter 140, the SCR catalyst 150 and the $AMO_x$ catalyst 160. Such aftertreatment components may comprise, for example, mixers, baffle plates, secondary filters (e.g., a secondary partial flow or catalyzed filter) or any other suitable aftertreatment component.

A reductant port 156 may be positioned on a sidewall of the housing 101 and structured to allow insertion of a reductant therethrough into the internal volume defined by the housing 101. The reductant port 156 may be positioned upstream of the SCR catalyst 150 (e.g., to allow reductant to be inserted into the exhaust gas upstream of the SCR catalyst 150) or over the SCR catalyst 150 (e.g., to allow reductant to be inserted directly on the SCR catalyst 150). In other embodiments, the reductant port 156 may be disposed on the inlet conduit 102 and configured to insert the reductant into the inlet conduit 102 upstream of the SCR catalyst 150. In such embodiments, mixers, baffles, vanes or other structures may be positioned in the inlet conduit 102 so as to facilitate mixing of the reductant with the exhaust gas.

The reductant storage tank 110 is configured to store a reductant. The reductant is formulated to facilitate decomposition of the constituents of the exhaust gas (e.g., $NO_x$ gases included in the exhaust gas). Any suitable reductant can be used. In some embodiments, the exhaust gas comprises a diesel exhaust gas and the reductant comprises a diesel exhaust fluid. For example, the diesel exhaust fluid may comprise urea, an aqueous solution of urea, or any other fluid that comprises ammonia, by-products, or any other diesel exhaust fluid as is known in the arts (e.g., the diesel exhaust fluid marketed under the name ADBLUE®). For example, the reductant may comprise an aqueous urea solution having a particular ratio of urea to water. In particular embodiments, the reductant can comprise an aqueous urea solution including 32.5% by volume of urea and 67.5% by volume of deionized water, including 40% by volume of urea and 60% by volume of deionized water, or any other suitable ratio of urea to deionized water.

A reductant insertion assembly 120 is fluidly coupled to the reductant storage tank 110. The reductant insertion assembly 120 is configured to selectively insert the reductant into the SCR catalyst 150 or upstream thereof (e.g., into the inlet conduit 102) or a mixer (not shown) positioned upstream of the SCR catalyst 150. The reductant insertion assembly 120 may comprise various structures to facilitate receipt of the reductant from the reductant storage tank 110 and delivery to the SCR catalyst 150, for example, pumps, valves, screens, filters, etc.

The aftertreatment system 100 may also comprise a reductant injector fluidly coupled to the reductant insertion assembly 120 and configured to insert the reductant (e.g., a combined flow of reductant and compressed air) into the SCR catalyst 150. In various embodiments, the reductant injector may comprise a nozzle having predetermined diameter. In various embodiments, the reductant injector may be positioned in the reductant port 156 and structured to deliver a stream or a jet of the reductant into the internal volume of the housing 101 so as to deliver the reductant to the SCR catalyst 150.

The controller 170 may be configured to be communicatively coupled to the first sensor 103 and may be configured to receive a first sensor signal from the first sensor 103, for example, to determine an amount of $NO_x$ gases included in the exhaust gas entering the aftertreatment system 100. The controller 170 may also be configured to be communicatively coupled to the second sensor 105 and may be configured to determine a concentration of $NO_x$ gases or ammonia included in the exhaust gas being expelled into the environment. The controller 170 may also be configured to be coupled to the engine 10, the oxidation catalyst inlet and outlet temperature sensors 133 and 135 to and configured to receive temperature signals therefrom to determine the estimated oxidation catalyst bed temperature.

Additionally, the controller 170 may be configured to be coupled to the SCR inlet and outlet temperature sensors 153 and 155, and configured to receive temperature signals therefrom to determine the estimated SCR catalyst bed temperature. The controller 170 may also be configured to be coupled to the oxidation catalyst heater 134 and the SCR catalyst heater 154 and configured to selectively activate the heater 134 or 154 so as to heat the oxidation catalyst 130 and the SCR catalyst 150 to a predetermined temperature, respectively.

The controller 170 may be configured to be operably coupled to the reductant insertion assembly 120, the hydrocarbon insertion assembly 132, and various components of the aftertreatment system 100 using any type and any number of wired or wireless connections. For example, a wired connection may include a serial cable, a fiber optic cable, a CATS cable, or any other form of wired connection. Wireless connections may include the Internet, Wi-Fi, cellular, radio, Bluetooth, ZigBee, etc. In one embodiment, a controller area network (CAN) bus provides the exchange of signals, information, and/or data. The CAN bus includes any number of wired and wireless connections.

In some embodiments, the controller 170 is configured to determine an actual SCR catalytic CE of the SCR catalyst 150. For example, the controller 170 may receive an inlet $NO_x$ amount signal from the first sensor 103, an outlet $NO_x$ amount signal from the second sensor 105, and determine the SCR catalytic CE based on the inlet and outlet $NO_x$ amount. In other words, the decrease in the amount of $NO_x$ gases after the exhaust gas passes through the SCR catalyst 150 is indicative of the SCR catalytic CE of the SCR catalyst 150.

The controller 170 determines an estimated SCR catalytic CE based on a test sulfur concentration selected by the controller 170, as described in further detail herein. The test sulfur concentration serves as a proxy for the actual concentration of the sulfur in the fuel. In response to the estimated SCR catalytic CE being within a predefined range (e.g., within ±10%, ±5%, or ±1%, inclusive), the controller sets the test sulfur concentration as a determined sulfur concentration in the fuel. In some embodiments, the predefined range may be a calibratable or adjustable value. The controller 170 generates a sulfur concentration signal indicating the determined sulfur concentration in the fuel.

Expanding further, the controller 170 is configured to determine an amount of a reductant inserted into the aftertreatment system 100. For example, the controller 170 may be configured to receive a reductant amount signal from the reductant insertion assembly 120 and determine the amount of reductant inserted into the aftertreatment system 100 therefrom (e.g., moles of the reductant inserted into the exhaust gas by the reductant insertion assembly 120).

The controller 170 is configured to determine an estimated cumulative sulfur poisoning level of the SCR catalyst 150 based on the amount of the reductant inserted, an engine fueling (i.e., amount of fuel inserted into the engine), an engine speed of the engine 10, a test sulfur concentration, a SCR catalyst bed temperature of the SCR catalyst 150, a SCR catalyst sulfur loading capacity, and an oxidation catalyst bed temperature of the oxidation catalyst 130. For example, the controller 170 may receive a speed signal from the engine 10 and determine the engine speed therefrom. The controller 170 may be configured to include various estimation models, algorithms, equations, or lookup tables corresponding to various test sulfur concentrations. The test sulfur concentrations may include fixed test sulfur concentration values, for example, 10 ppm to 2,000 ppm, for example, fixed values 10 ppm, 50 ppm, 100 ppm, 500 ppm, 1,000 ppm, or 2,000 ppm, or dynamic values within the range of 10 ppm to 1000 ppm, inclusive.

The controller 170 may select a first test sulfur concentration, for example, 500 ppm, as a proxy for the actual fuel sulfur concentration. In response to the estimated SCR catalytic CE being outside the predefined range (e.g., outside ±10% of the actual SCR catalytic CE), the controller 170 may select a second test sulfur concentration (e.g., 1,000 ppm) different from the first test sulfur concentration. The controller 170 is configured to determine the estimated cumulative sulfur poisoning level of the SCR catalyst based on a second test sulfur concentration, and continue to repeat the process unless the estimated SCR catalytic CE is within the predefined range.

The controller 170 may be configured to determine the SCR catalyst bed temperature based on an SCR inlet temperature signal and an SCR outlet temperature signal received from the SCR inlet and outlet temperature sensors 153 and 155, as previously described herein. The controller 170 may also be configured to determine the SCR catalyst bed temperature based on an oxidation catalyst inlet temperature signal and an oxidation catalyst outlet temperature signal received from the oxidation catalyst inlet and outlet temperature sensors 133 and 135, as previously described herein.

The cumulative sulfur poisoning level includes physical poisoning and the chemical poisoning of the SCR catalyst 150. The physical poisoning of the SCR catalyst occurs due to ammonium bisulfate (ABS) formation on the SCR catalyst due to reaction of ammonia released from the reductant inserted into the exhaust gas, and $SO_x$ gases present in the exhaust gas due to the sulfur present in the fuel. Physical poisoning leads to decrease in SCR catalytic CE of the SCR catalyst 150. Heating the SCR catalyst to a temperature in a range of 350-500 degrees Celsius results in decomposition of the accumulated ABS and release of $SO_2$ corresponding to the ABS loading.

Chemical poisoning occurs due to binding of the $SO_x$ species to the active catalytic ions (e.g., copper ions) of the SCR catalyst 150, Heating the SCR catalyst in a temperature range of 500-950 degrees Celsius also results in release of $SO_2$ corresponding to the chemical poisoning.

The controller 170 may be configured to determine the estimated cumulative poisoning by determining an estimated physical poisoning and chemical poisoning of the SCR catalyst 150. For example, the controller may determine an estimated sulfur exposure level of the SCR catalyst 150 based on a fueling amount (i.e., an amount of fuel inserted into the engine 10 based on a fuel signal from the engine 10), the engine speed, and the test sulfur concentration. The controller 170 may determine an estimated sulfur slip from the oxidation catalyst 130 and a $SO_2/SO_3$ fraction based on the sulfur exposure level, the oxidation catalyst bed temperature, and a sulfur storage capacity of the oxidation catalyst 130. The sulfur storage capacity of the oxidation catalyst 130 may be predetermined based on the physical characteristics of the oxidation catalyst 130.

The controller 170 may be configured to determine an estimated ABS loading of the SCR catalyst 150 and a first $SO_2$ release level from the SCR catalyst 150 corresponding to the ABS loading based on the estimated sulfur slip, the $SO_2/SO_3$ fraction, the amount of reductant inserted, and the SCR catalyst bed temperature. Moreover, the controller 170 may also be configured to determine an estimated chemical poisoning of the SCR catalyst 150 and a second $SO_2$ release level from the SCR catalyst 150 corresponding to the chemical poisoning based on the estimated sulfur slip, the $SO_2/SO_3$ fraction, the SCR catalyst bed temperature, and a SCR catalyst sulfur storage capacity. The sulfur storage capacity of the SCR catalyst 150 may be predetermined based on the physical characteristics of the SCR catalyst 150. The controller 170 is configured to determine the estimated cumulative poisoning of the SCR catalyst 150 based on the ABS loading, the first $SO_2$ release level, the chemical poisoning, and the second $SO_2$ release level.

The controller 170 is configured to determine the estimated SCR catalytic CE of the SCR catalyst 150 based on at least the cumulative sulfur poisoning level and the SCR catalyst bed temperature. The controller 170 is configured to compare the estimated SCR catalytic CE with the actual SCR catalytic CE, and sets the test sulfur concentration as the determined sulfur concentration in the fuel in response to the estimated SCR catalytic CE being within the predefined range.

In response to the SCR catalytic CE being within the predefined range, the controller 170 is configured to determine a difference between the estimated SCR catalytic CE and the actual SCR catalytic CE. In some embodiments, the controller 170 may be configured to determine an estimated sulfur concentration in the fuel based on the test sulfur concentration and the difference, and generate the sulfur concentration signal that indicates the estimated sulfur concentration as the sulfur concentration in the fuel.

In some embodiments, the controller 170 is further configured to heat the SCR catalyst 150 to a temperature above a regeneration temperature of the SCR catalyst (e.g., greater than 500 degrees Celsius) in response to the cumulative sulfur poisoning level being above a sulfur poisoning threshold. In some embodiments, the controller 170 may configured to control the reductant insertion assembly 120 (e.g., activate or deactivate the reductant insertion assembly to start or stop reductant insertion), or enable or disable stationary regeneration of the SCR catalyst 150 based on the estimated fuel sulfur concentration (e.g., the test sulfur concentration or the estimated sulfur concentration).

Figure 2:
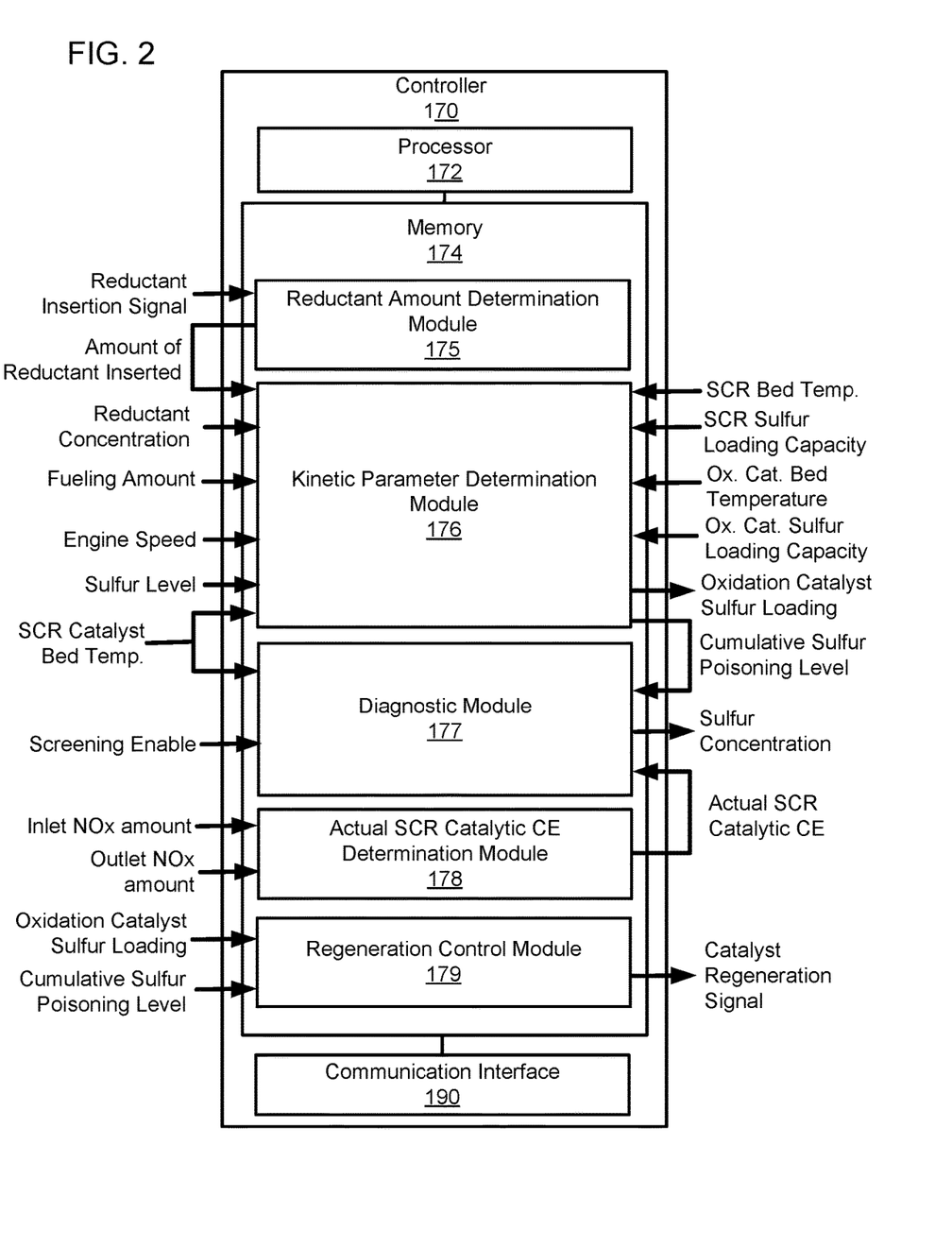
FIG. 2 is a schematic block diagram of a control module that may include a controller of the aftertreatment system of FIG. 1, according to an embodiment.

FIG. 2 is a schematic block diagram of the controller 170 that shows various modules and submodules that may be included in the controller 170, according to an embodiment. The controller 170 comprises a processor 172, a memory 174, or any other computer readable medium, and a communication interface 190. Furthermore, the controller 170 includes a reductant amount determination module 175, a kinetic parameter estimation module 176, a diagnostic module 177, an actual SCR catalytic CE determination module 178, and a regeneration control module 179. Each of these modules may include further modules and submodules as described in detail herein. It should be understood that the controller 170 shows only one embodiment of the controller 170 and any other controller capable of performing the operations described herein can be used.

The processor 172 can comprise a microprocessor, programmable logic controller (PLC) chip, an ASIC chip, or any other suitable processor. The processor 172 is in communication with the memory 174 and configured to execute instructions, algorithms, commands, or otherwise programs stored in the memory 174.

The memory 174 comprises any of the memory and/or storage components discussed herein. For example, memory 174 may comprise a RAM and/or cache of processor 172. The memory 174 may also comprise one or more storage devices (e.g., hard drives, flash drives, computer readable media, etc.) either local or remote to controller 170. The memory 174 is configured to store look up tables, algorithms, or instructions.

In one configuration, the reductant amount determination module 175, the kinetic parameter estimation module 176, the diagnostic module 177, the actual SCR catalytic CE determination module 178, the regeneration control module 179, and various modules and submodules thereof are embodied as machine or computer-readable media (e.g., stored in the memory 174) that is executable by a processor, such as the processor 172. As described herein and amongst other uses, the machine-readable media (e.g., the memory 174) facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). Thus, the computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the reductant amount determination module 175, the kinetic parameter estimation module 176, the diagnostic module 177, the actual SCR catalytic CE determination module 178, the regeneration control module 179, and various modules and submodules thereof are embodied as hardware units, such as electronic control units. As such, the reductant amount determination module 175, the kinetic parameter estimation module 176, the diagnostic module 177, the actual SCR catalytic CE determination module 178, the regeneration control module 179, and various modules and submodules thereof may be embodied as one or more circuitry components including, but not limited to, processing circuitry, network interfaces, peripheral devices, input devices, output devices, sensors, etc.

In some embodiments, the reductant amount determination module 175, the kinetic parameter estimation module 176, the diagnostic module 177, the actual SCR catalytic CE determination module 178, the regeneration control module 179, and various modules and submodules thereof may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the reductant amount determination module 175, the kinetic parameter estimation module 176, the diagnostic module 177, the actual SCR catalytic CE determination module 178, the regeneration control module 179, and various modules and submodules thereof may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on.

Thus, the reductant amount determination module 175, the kinetic parameter estimation module 176, the diagnostic module 177, the actual SCR catalytic CE determination module 178, the regeneration control module 179, and various modules and submodules thereof may also include programmable hardware devices such as field programmable gate arrays, programmable array logic, programmable logic devices or the like. In this regard, the reductant amount determination module 175, the kinetic parameter estimation module 176, the diagnostic module 177, the actual SCR catalytic CE determination module 178, the regeneration control module 179, and various modules and submodules thereof may include one or more memory devices for storing instructions that are executable by the processor(s) of the reductant amount determination module 175, the kinetic parameter estimation module 176, the diagnostic module 177, the actual SCR catalytic CE determination module 178, the regeneration control module 179, and various modules and submodules thereof. The one or more memory devices and processor(s) may have the same definition as provided below with respect to the memory 174 and the processor 172.

In the example shown, the controller 170 includes the processor 172 and the memory 174. The processor 172 and the memory 174 may be structured or configured to execute or implement the instructions, commands, and/or control processes described herein with respect to the reductant amount determination module 175, the kinetic parameter estimation module 176, the diagnostic module 177, the actual SCR catalytic CE determination module 178, the regeneration control module 179, and various modules and submodules thereof. Thus, the depicted configuration represents the aforementioned arrangement the reductant amount determination module 175, the kinetic parameter estimation module 176, the diagnostic module 177, the actual SCR catalytic CE determination module 178, the regeneration control module 179, and various modules and submodules thereof are embodied as machine or computer-readable media. However, as mentioned above, this illustration is not meant to be limiting as the present disclosure contemplates other embodiments such as the aforementioned embodiment where the reductant amount determination module 175, the kinetic parameter estimation module 176, the diagnostic module 177, the actual SCR catalytic CE determination module 178, the regeneration control module 179, and various modules and submodules thereof, or at least one circuit of the reductant amount determination module 175, the kinetic parameter estimation module 176, the diagnostic module 177, the actual SCR catalytic CE determination module 178, the regeneration control module 179, and various modules and submodules thereof are configured as a hardware unit. All such combinations and variations are intended to fall within the scope of the present disclosure.

The processor 172 may be implemented as one or more general-purpose processors, an application specific integrated circuit (ASIC), one or more field programmable gate arrays (FPGAs), a digital signal processor (DSP), a group of processing components, or other suitable electronic processing components. In some embodiments, the one or more processors may be shared by multiple circuits (e.g., the reductant amount determination module 175, the kinetic parameter estimation module 176, the diagnostic module 177, the actual SCR catalytic CE determination module 178, the regeneration control module 179, and various modules and submodules thereof) may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure. The memory 174 (e.g., RAM, ROM, Flash Memory, hard disk storage, etc.) may store data and/or computer code for facilitating the various processes described herein. The memory 174 may be communicably connected to the processor 172 to provide computer code or instructions to the processor 172 for executing at least some of the processes described herein. Moreover, the memory 174 may be or include tangible, non-transient volatile memory or non-volatile memory. Accordingly, the memory 174 may include database components, object code components, script components, or any other type of information structure for supporting the various activities and information structures described herein The communication interface 190 may include wireless interfaces (e.g., jacks, antennas, transmitters, receivers, communication interfaces, wire terminals, etc.) for conducting data communications with various systems, devices, or networks. For example, the communication interface 190 may include an Ethernet card and port for sending and receiving data via an Ethernet-based communications network and/or a Wi-Fi communication interface for communicating with the first sensor 103, the second sensor 105, the engine 10, the temperature sensors 133 and 153, the pressure sensor 142, or the heaters 134 and 154, the reductant insertion assembly 120, and the hydrocarbon insertion assembly 132. The communication interface 190 may be structured to communicate via local area networks or wide area networks (e.g., the Internet, etc.) and may use a variety of communications protocols (e.g., IP, LON, Bluetooth, ZigBee, radio, cellular, near field communication, etc.).

The reductant amount determination module 175 is configured to determine an amount of reductant inserted into the aftertreatment system 100. For example, the reductant amount determination module 175 may receive reductant insertion signals from the reductant insertion assembly 120 and determine the amount of reductant inserted (e.g., in moles or reductant) into the aftertreatment system 100.

The actual SCR catalytic CE determination module 178 is configured to determine the actual SCR catalytic CE of the SCR catalyst 150. For example, the actual SCR catalytic CE determination module 178 may receive the inlet $NO_x$ amount signal from the first sensor 103 and the outlet $NO_x$ amount signal from the second sensor 105 and determine the actual SCR catalytic CE of the SCR catalyst 150 therefrom.

The kinetic parameter estimation module 176 is configured to determine an estimated cumulative sulfur poisoning level of the SCR catalyst 150 based on the amount of the reductant inserted, the engine fueling amount, the engine speed of the engine 10, the test sulfur concentration, the SCR catalyst bed temperature of the SCR catalyst 150 a SCR catalyst sulfur loading capacity, and an oxidation catalyst bed temperature of the oxidation catalyst 130.

Figure 3:
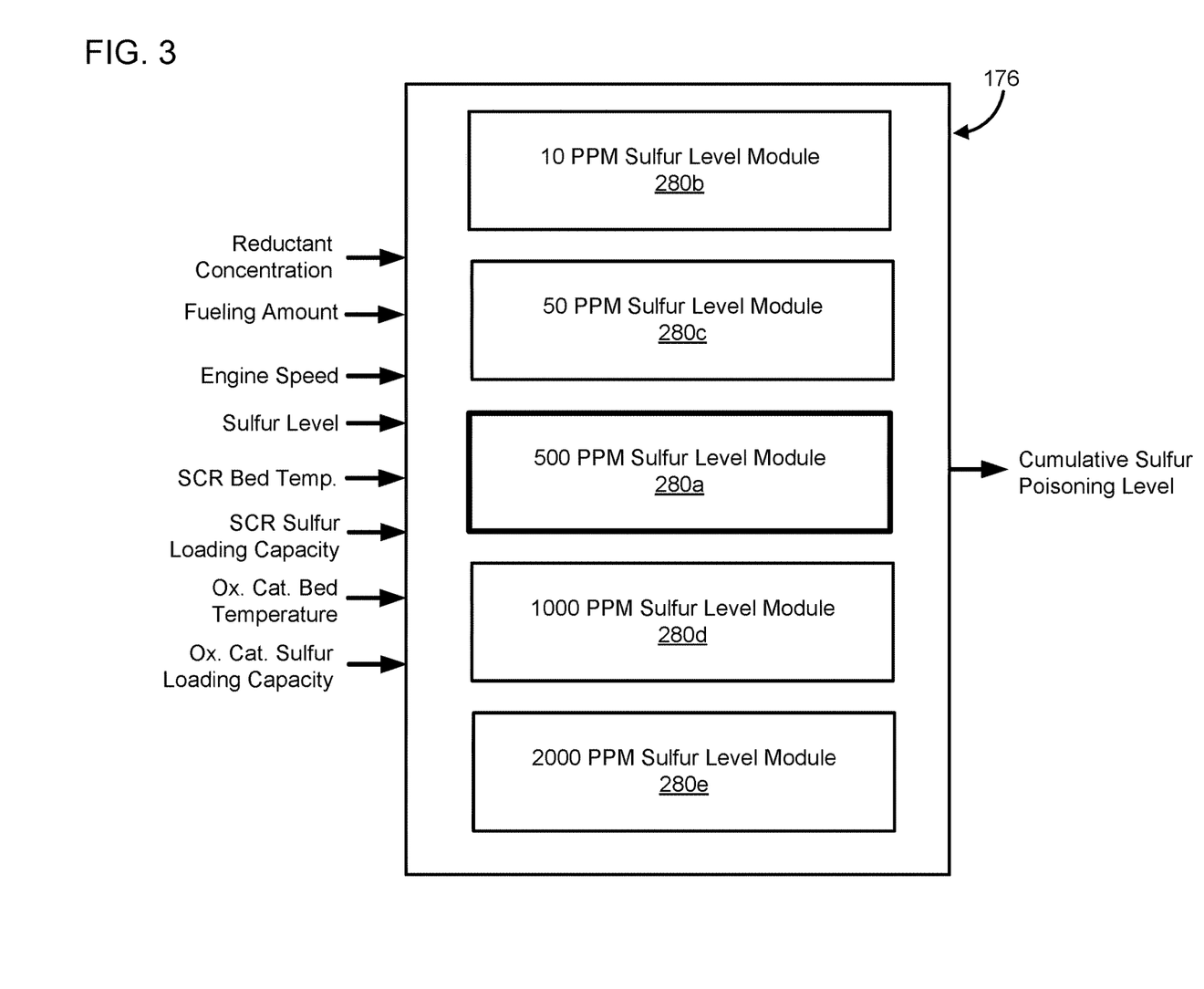
FIG. 3 is a schematic block diagram of a kinetic parameter estimation module included in the controller of FIG. 2, according to an embodiment.

FIG. 3 shows various sulfur level modules 280, each corresponding to a specific test sulfur concentration, may be included in the kinetic parameter estimation module 176. For example, the kinetic parameter estimation module 176 includes a 500 ppm sulfur level module 280a, a 10 ppm sulfur level module 280b, a 100 ppm sulfur level module 280c, a 1,000 ppm sulfur level module 280d, and a 2,000 ppm sulfur level module 280e. Each of the sulfur level modules 280 may have similar modules but are dedicated for determining the estimated cumulative sulfur poisoning level based on a test sulfur concentration specific to that sulfur level module 280. It should be appreciated that while FIG. 3 shows five sulfur level modules 280, the kinetic parameter estimation module 176 may include any number of sulfur level modules, each dedicated to a specific test sulfur concentration. The kinetic parameter estimation module 176 may be configured to select a specific sulfur level module 280 corresponding to a specific test sulfur concentration which serves as a proxy for the fuel sulfur concentration in that specific run.

Figure 4:
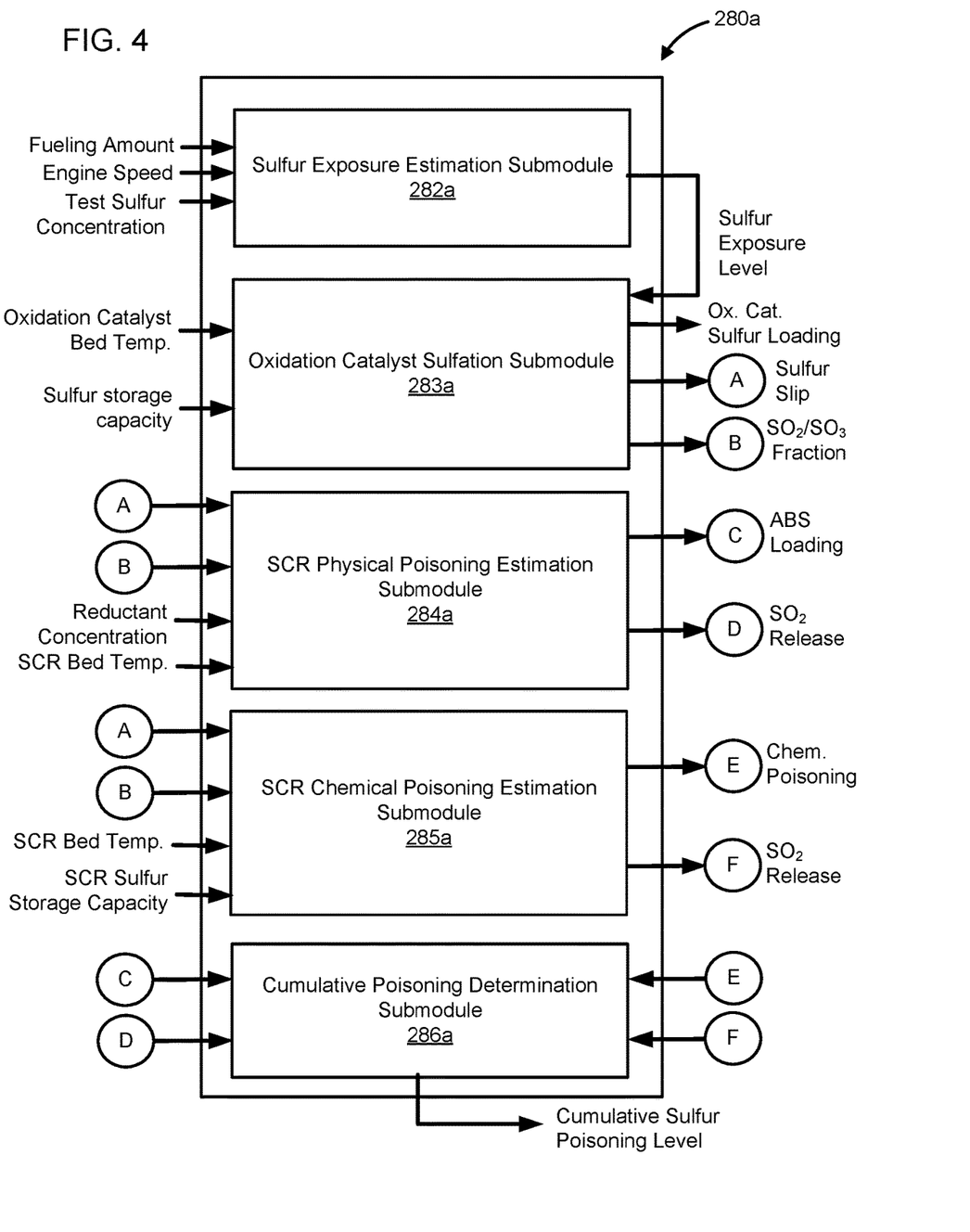
FIG. 4 is a schematic block diagram of various submodules of a 500 ppm sulfur level module included in the kinetic parameter estimation module of FIG. 3, according to an embodiment.

For example, FIG. 4 shows a schematic block diagram of the 500 ppm sulfur level module 280a showing the various submodules included therein. It should be appreciated that each of the sulfur level modules 280a may include similar submodules to the submodules included in the 500 ppm sulfur level module. The 500 ppm sulfur level module 280a includes a sulfur exposure estimation submodule 282a configured to determine an estimated sulfur exposure level of the SCR catalyst 150 based on the fueling amount, the engine speed, and the test sulfur concentration. For example, the sulfur exposure estimation submodule 282a may receive a fueling amount and an engine speed signal from the engine 10, select 500 ppm as the test sulfur concentration, and determine the sulfur exposure level (i.e., an amount of $SO_x$ gases in the exhaust gas entering the aftertreatment system 100) of the SCR catalyst 150.

The 500 ppm sulfur level module 280a also includes an oxidation catalyst sulfation submodule 283a configured to determine an estimated sulfur slip from the oxidation catalyst 130 and a $SO_2/SO_3$ fraction in the exhaust gas based on the sulfur exposure level, the oxidation catalyst bed temperature, and a sulfur storage capacity of the oxidation catalyst 130. In some embodiments, the oxidation catalyst sulfation submodule 283a is also configured to determine a sulfur loading on the oxidation catalyst 130, and generate an oxidation catalyst sulfur loading signal.

The 500 ppm sulfur level module 280a also includes a SCR physical poisoning estimation submodule 284a configured to determine an estimated ABS loading of the SCR catalyst 150 and a first $SO_2$ release level from the SCR catalyst 150 corresponding to the ABS loading based on the estimated sulfur slip, the $SO_2/SO_3$ fraction, the amount of reductant inserted, and the SCR catalyst bed temperature.

The 500 ppm sulfur level module 280a also includes a SCR chemical poisoning estimation submodule 285a configured to determine an estimated chemical poisoning level of the SCR catalyst 150 and a second $SO_2$ release level from the SCR catalyst 150 corresponding to the chemical poisoning level based on the estimated sulfur slip, the $SO_2/SO_3$ fraction, the SCR catalyst bed temperature, and the SCR catalyst sulfur storage capacity.

Furthermore, the 500 ppm sulfur level module 280a includes a cumulative poisoning determination submodule 286a configured to determine the estimated cumulative sulfur poisoning level of the SCR catalyst 150 based on the ABS loading, the first $SO_2$ release level, the chemical poisoning level, and the second $SO_2$ release level, and generate a cumulative sulfur poisoning level signal.

Referring again to FIG. 2, the diagnostic module 177 is configured to determine the estimated SCR catalytic conversion efficiency of the SCR catalyst 150 based on at least the cumulative sulfur poisoning level and the SCR catalyst bed temperature. In some embodiments, the diagnostic module 177 may be configured to determine the estimated SCR catalytic conversion efficiency based also on a screening enable signal. For example, the screening enable signal may be generated by the actual SCR catalytic CE determination module 178 in response to determining a rate of decrease in the SCR catalytic CE, which is higher than a rate decrease threshold. The rate decrease threshold may correspond to decrease in the SCR catalytic CE that is not attributable to an expected decreased in SCR catalytic CE due to normal operation, and can only be attributed to sulfation of the SCR catalyst 150 due to presence of sulfur in the fuel being consumed by the engine 10. The screening enable signal may activate the diagnostic module 177 for estimating the sulfur concentration in the fuel.

Figure 5:
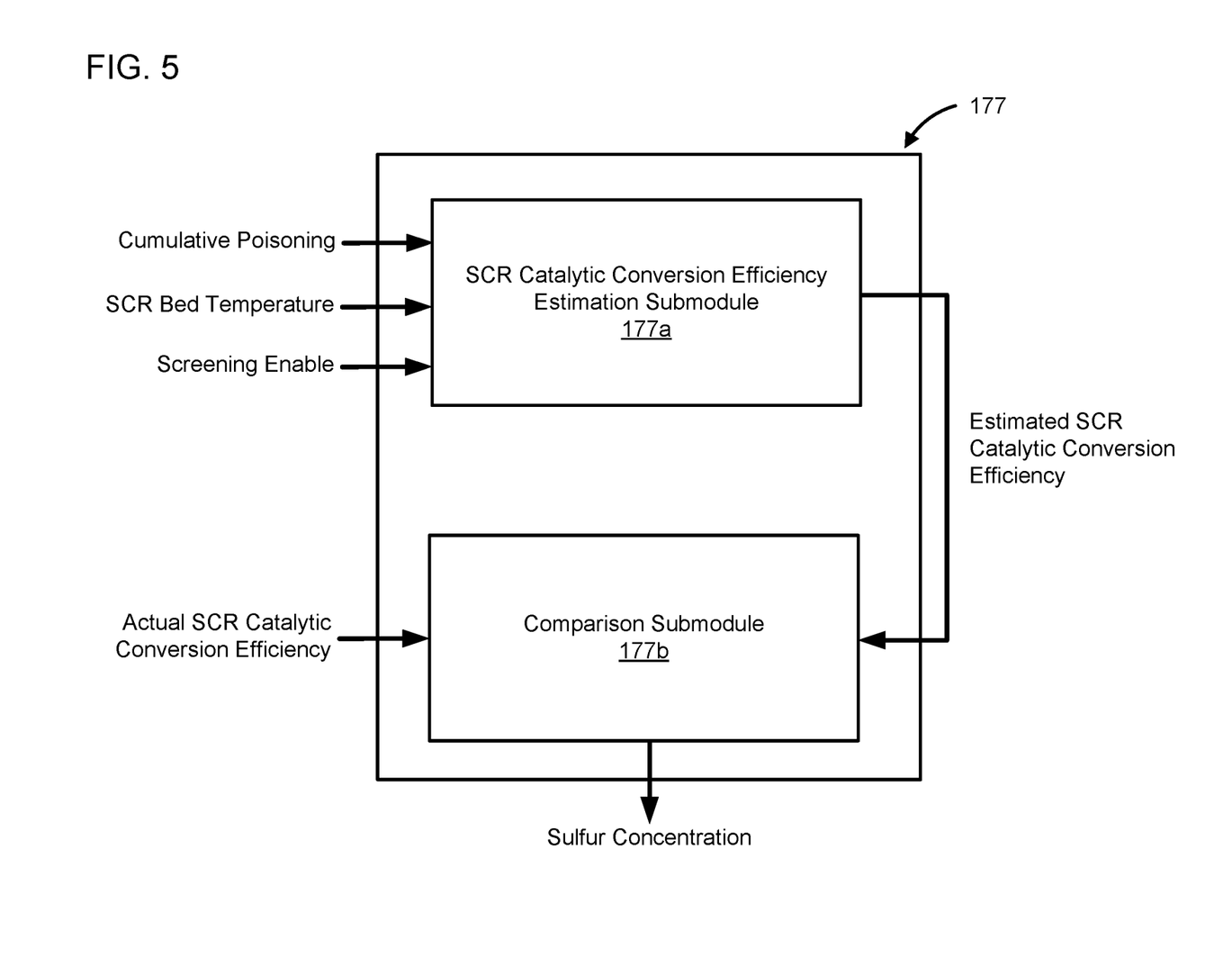
FIG. 5 is a schematic block diagram of a diagnostic module included in the controller of FIG. 2, according to an embodiment.

The diagnostic module 177 may also include a plurality of submodules. For example, FIG. 5 is a schematic block diagram of the diagnostic module 177, according to an embodiment. The diagnostic module 177 may include a SCR catalytic CE estimation submodule 177a configured to determine the estimated SCR catalytic CE based on the estimated cumulative sulfur poisoning level and the SCR catalyst bed temperature. The diagnostic module 177 may also include a comparison submodule 177b configured to compare the estimated SCR catalytic CE with the actual SCR catalytic CE.

In response to determining that the estimated SCR catalytic CE is within a predefined range, the comparison submodule 177b sets the test sulfur concentration (e.g., 500 ppm) as a determined sulfur concentration in the fuel and generates the sulfur concentration signal. In some embodiments, in response to the estimated SCR catalytic CE being within the predefined range, the comparison submodule 177b may determine a difference between the estimated SCR catalytic CE and the actual SCR catalytic CE. The comparison submodule 177b may be configured to determine an estimated sulfur concentration in the fuel based on the test sulfur concentration and the difference (e.g., via equations, algorithms or lookup tables), and generate a second sulfur concentration signal indicating the estimated sulfur concentration as the sulfur concentration in the fuel.

In some embodiments, the test sulfur concentration may be a first test sulfur concentration (e.g., 500 ppm corresponding to the sulfur level module 280a). In such embodiments, in response to the estimated SCR catalytic CE being outside the predefined range, the comparison submodule may be configured to instruct the kinetic parameter estimation module 176 to determine the estimated cumulative sulfur poisoning level of the SCR catalyst 150 based on a second test sulfur concentration different from the first test sulfur concentration (e.g., 1,000 ppm corresponding to the 1,000 ppm sulfur level module 280d). Thus, the second sulfur concentration now serves as a proxy for the fuel sulfur concentration in the second run.

The regeneration control module 179 may be configured to heat the SCR catalyst 150 to a temperature above a regeneration temperature of the SCR catalyst 150 in response to the cumulative sulfur poisoning level being above a sulfur poisoning threshold. The regeneration facilitates desorption of the absorbed or chemisorbed sulfur from the SCR catalyst 150, and may facilitate decomposition of soot or particulate matter accumulated on the SCR catalyst 150.

Figure 6A:
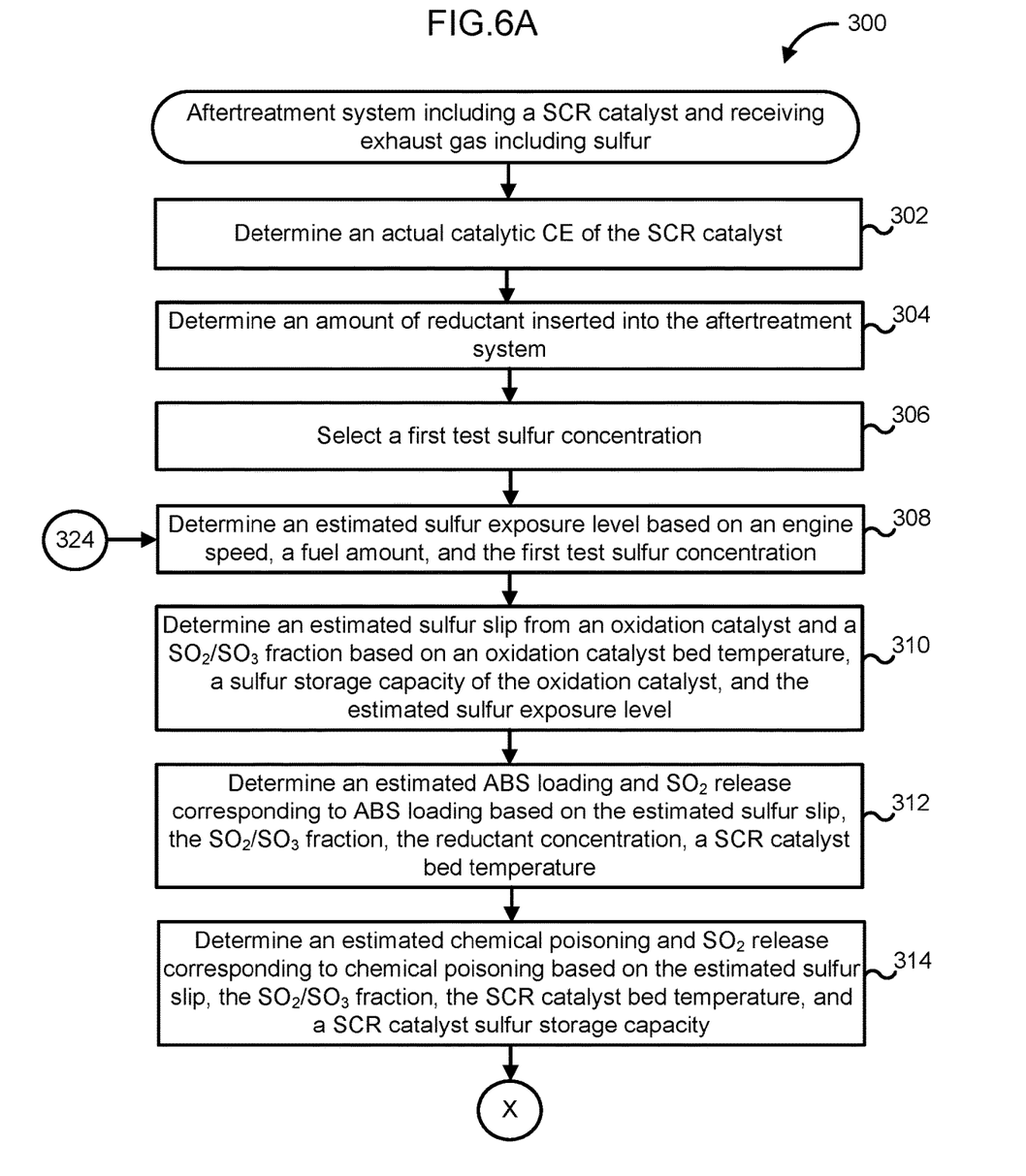
FIGS. 6A-6B are schematic flow diagrams of a method for virtually determining a sulfur concentration in a fuel provided to an engine, according to an embodiment.
Figure 6B:
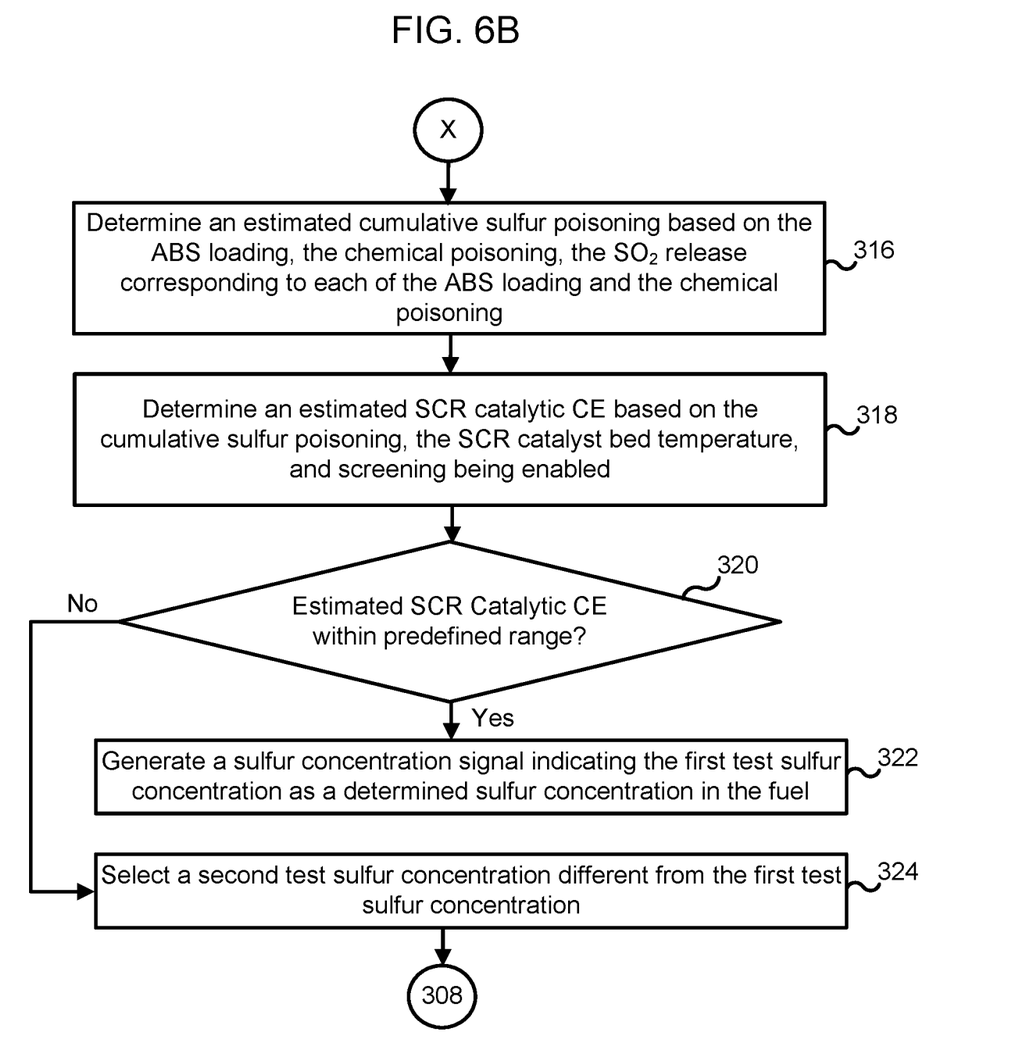

FIGS. 6A-6B are a schematic flow diagram of a controller based method 300 for virtually determining a concentration of sulfur in a fuel provided to the engine 10 to which the aftertreatment system 100 is coupled, according to an embodiment. While the operations of the method 300 are described with respect to the controller 170 and the aftertreatment system 100, it should be understood that the operations of the method 300 may be implemented in any controller 170 included in any aftertreatment system 100 to determine fuel sulfur concentration of a fuel provided to any engine 10.

At 302, the controller 170 determines an actual SCR catalytic CE of the SCR catalyst 150. For example, the controller 170 may receive an inlet $NO_x$ amount signal from the first sensor 103, an outlet $NO_x$ amount signal from the second sensor 105, and determine the SCR catalytic CE based on the inlet and outlet $NO_x$ amount.

At 304, the controller 170 determines an amount of reductant inserted into the aftertreatment system 100, for example, based on a signal received from the reductant insertion assembly 120.

At 306, the controller 170 selects a test sulfur concentration, for example, a first test sulfur concentration. For example, the kinetic parameter estimation module 176 of the controller 170 selects the 500 ppm sulfur level module 280a, and thereby 500 ppm as the first test sulfur concentration.

The method includes determining an estimated SCR catalytic CE of the SCR catalyst 150 based on the test sulfur concentration. For example, at 308, the controller 170 determines an estimated sulfur exposure level of the SCR catalyst 150 based on an engine speed, a fuel amount, and a test sulfur concentration.

At 310, the controller 170 determines an estimated sulfur slip from the oxidation catalyst 130 and a $SO_2/SO_3$ fraction based on the sulfur exposure level, the oxidation catalyst bed temperature, and a sulfur storage capacity of the oxidation catalyst 130. The sulfur storage capacity of the oxidation catalyst 130 may be predetermined based on the physical characteristics of the oxidation catalyst 130.

At 312, the controller 170 determines an estimated ABS loading of the SCR catalyst 150 and a first $SO_2$ release level from the SCR catalyst 150 corresponding to an ABS loading on the SCR catalyst 150 based on the estimated sulfur slip, the $SO_2/SO_3$ fraction, the amount of reductant inserted, and the SCR catalyst bed temperature.

At 314, the controller 170 determines an estimated chemical poisoning of the SCR catalyst 150 and a second $SO_2$ release level from the SCR catalyst 150 corresponding to the chemical poisoning based on the estimated sulfur slip, the $SO_2/SO_3$ fraction, the SCR catalyst bed temperature, and a SCR catalyst sulfur storage capacity.

At 316, the controller 170 determines an estimated cumulative sulfur poisoning level of the SCR catalyst 150 based on the ABS loading, the chemical poisoning, the first $SO_2$ release level, and the second $SO_2$ release level.

At 318, the controller 170 determines the estimated SCR catalytic CE of the SCR catalyst 150 based on at least the cumulative sulfur poisoning level and the SCR catalyst bed temperature.

At 320, the controller 170 determines whether the estimated SCR catalytic CE is within a predefined range. In response to the estimated SCR catalytic CE being within the predefined range (e.g., ±10%, ±5%, or ±1%, inclusive of the actual SCR catalytic CE) (320:YES), the controller 170 sets the first test sulfur concentration as a determined fuel sulfur concentration, and generates a sulfur concentration signal indicating the determined sulfur concentration in the fuel, at 322.

However, if the controller 170 determines that estimated SCR catalytic CE is outside the predefined range (320:NO), the controller 170 selects a second test sulfur concentration different from the first test sulfur concentration, at 324. The method then returns to operation 308. In some embodiments, the method 300 may also include in response to the actual SCR catalytic conversion efficiency being less than a SCR catalytic conversion efficiency threshold, cause heating of the SCR catalyst 150, by the controller 170, to a temperature above a regeneration temperature of the SCR catalyst 150.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

As used herein, the term "approximately" generally mean plus or minus 10% of the stated value. For example, about 0.5 would include 0.45 and 0.55, about 10 would include 9 to 11, about 1000 would include 900 to 1100.

The term "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements; values of parameters, mounting arrangements; use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes, and omissions may also be made in the design, operating conditions, and arrangement of the various exemplary embodiments without departing from the scope of the present embodiments.

While this specification contains many specific implementation details, these should not be construed as limitations on the scope of any embodiments or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A controller for an aftertreatment system that is configured to treat constituents of an exhaust gas produced by an engine and that comprises a selective catalytic reduction (SCR) catalyst and an oxidation catalyst, the controller being configured to be operatively coupled to the aftertreatment system, the controller configured to:
   determine an actual SCR catalytic conversion efficiency of the SCR catalyst,
   determine an estimated SCR catalytic conversion efficiency based on a test sulfur concentration selected by the controller,
   in response to the estimated SCR catalytic conversion efficiency being within a predefined range, set the test sulfur concentration as a determined sulfur concentration in a fuel provided to the engine, and
   generate a sulfur concentration signal indicating the determined sulfur concentration in the fuel.

2. The controller of claim 1, wherein:
   the controller is also operatively coupled to the engine, the controller configured to determine the estimated SCR catalytic conversion efficiency of the SCR catalyst by performing steps comprising:
   determining an amount of a reductant inserted into the aftertreatment system,
   determining an estimated cumulative sulfur poisoning level of the SCR catalyst based on the amount of the reductant inserted, a fueling amount of fuel inserted into the engine, an engine speed of the engine, the test sulfur concentration, a SCR catalyst bed temperature of the SCR catalyst, a SCR catalyst sulfur loading capacity, and an oxidation catalyst bed temperature of the oxidation catalyst, and
   determining the estimated SCR catalytic conversion efficiency of the SCR catalyst based on at least the estimated cumulative sulfur poisoning level, and the SCR catalyst bed temperature.

3. The controller of claim 2, wherein:
   the controller is configured to determine the estimated cumulative sulfur poisoning level of the SCR catalyst by performing steps comprising:
   determining an estimated sulfur exposure level based on a fueling amount of the fuel inserted into the engine, the engine speed, and the test sulfur concentration;
   determining an estimated sulfur slip from the oxidation catalyst and a $SO_2/SO_3$ fraction based on the sulfur exposure level, the oxidation catalyst bed temperature, and a sulfur storage capacity of the oxidation catalyst;
   determining an estimated ammonium bisulfate (ABS) loading of the SCR catalyst and a first $SO_2$ release level from the SCR catalyst corresponding to the ABS loading based on the estimated sulfur slip, the $SO_2/SO_3$ fraction, the amount of reductant inserted, and the SCR catalyst bed temperature;
   determining an estimated chemical poisoning level of the SCR catalyst and a second $SO_2$ release level from the SCR catalyst corresponding to the chemical poisoning level based on the estimated sulfur slip, the $SO_2/SO_3$ fraction, the SCR catalyst bed temperature, and a SCR catalyst sulfur storage capacity; and
   determining the estimated cumulative sulfur poisoning level of the SCR catalyst based on the ABS loading, the first $SO_2$ release level, the chemical poisoning level, and the second $SO_2$ release level.

4. The controller of claim 3, wherein the test sulfur concentration is a first test sulfur concentration, wherein the controller is further configured to:
   in response to the estimated SCR catalytic conversion efficiency being outside the predefined range, determine the estimated cumulative sulfur poisoning level of the SCR catalyst based on a second test sulfur concentration different from the first test sulfur concentration.

5. The controller of claim 1, wherein the controller is configured to determine the actual SCR catalytic conversion efficiency of the SCR catalyst based on an inlet $NO_x$ amount of $NO_x$ gases entering the aftertreatment system, and an outlet $NO_x$ amount of $NO_x$ gases exiting the aftertreatment system.

6. The controller of claim 1, further configured to:
   in response to the estimated SCR catalytic conversion efficiency being within the predefined range, determine a difference between the estimated SCR catalytic conversion efficiency and the actual SCR catalytic conversion efficiency;
   determine an estimated sulfur concentration in the fuel based on the test sulfur concentration and the difference; and
   generate a second sulfur concentration signal indicating the estimated sulfur concentration as the sulfur concentration in the fuel.

7. The controller of claim 1, further configured to:
   in response to the actual SCR catalytic conversion efficiency being less than a SCR catalytic conversion efficiency threshold, cause heating of the SCR catalyst to a temperature above a regeneration temperature of the SCR catalyst.

8. An aftertreatment system for treating constituents of an exhaust gas produced by an engine, comprising:
   an oxidation catalyst;
   a SCR catalyst disposed downstream of the oxidation catalyst; and
   a controller configured to:
   determine an actual SCR catalytic conversion efficiency of the SCR catalyst,
   determine an estimated SCR catalytic conversion efficiency based on a test sulfur concentration selected by the controller,
   in response to the estimated SCR catalytic conversion efficiency being within a predefined range, set the test sulfur concentration as a determined sulfur concentration in a fuel provided to the engine, and
   generate a sulfur concentration signal indicating the determined sulfur concentration in the fuel.

9. The aftertreatment system of claim 8, wherein the controller is operatively coupled to the engine, the controller configured to determine the estimated SCR catalytic conversion efficiency by performing steps comprising:

determining an amount of a reductant inserted into the aftertreatment system;

determining an estimated cumulative sulfur poisoning level of the SCR catalyst based on the amount of the reductant inserted, a fueling amount of fuel inserted into the engine, an engine speed of the engine, the test sulfur concentration, a SCR catalyst bed temperature of the SCR catalyst, a SCR catalyst sulfur loading capacity, and an oxidation catalyst bed temperature of the oxidation catalyst; and determining the estimated SCR catalytic conversion efficiency of the SCR catalyst based on at least the estimated cumulative sulfur poisoning level and the SCR catalyst bed temperature.

10. The aftertreatment system of claim 9, wherein the controller is configured to determine the estimated cumulative sulfur poisoning level of the SCR catalyst by performing steps comprising:

determining an estimated sulfur exposure level of the SCR catalyst based on the fueling amount, the engine speed, and the test sulfur concentration;

determining an estimated sulfur slip from the oxidation catalyst and a $SO_2/SO_3$ fraction based on the sulfur exposure level, the oxidation catalyst bed temperature, and a sulfur storage capacity of the oxidation catalyst;

determining an estimated ammonium bisulfate (ABS) loading of the SCR catalyst and a first $SO_2$ release level from the SCR catalyst corresponding to the ABS loading based on the estimated sulfur slip, the $SO_2/SO_3$ fraction, the amount of reductant inserted, and the SCR catalyst bed temperature;

determining an estimated chemical poisoning of the SCR catalyst and a second $SO_2$ release level from the SCR catalyst corresponding to the chemical poisoning based on the estimated sulfur slip, the $SO_2/SO_3$ fraction, the SCR catalyst bed temperature, and a SCR catalyst sulfur storage capacity;

determining the estimated cumulative sulfur poisoning level of the SCR catalyst based on the ABS loading, the first $SO_2$ release level, the chemical poisoning, and the second $SO_2$ release level.

11. The aftertreatment system of claim 9, wherein the test sulfur concentration is a first test sulfur concentration, and wherein the controller is further configured to:

in response to the estimated SCR catalytic conversion efficiency being outside the predefined range, determine the estimated cumulative sulfur poisoning level of the SCR catalyst based on a second test sulfur concentration different from the first test sulfur concentration.

12. The aftertreatment system of claim 8, wherein the controller is configured to determine the actual SCR catalytic conversion efficiency of the SCR catalyst based on an inlet $NO_x$ amount of $NO_x$ gases entering the aftertreatment system, and an outlet $NO_x$ amount of $NO_x$ gases exiting the aftertreatment system.

13. The aftertreatment system of claim 8, wherein the controller is further configured to:

in response to the estimated SCR catalytic conversion efficiency being within the predefined range, determine a difference between the estimated SCR catalytic conversion efficiency and the actual SCR catalytic conversion efficiency;

determine an estimated sulfur concentration in the fuel based on the test sulfur concentration and the difference; and generate a second sulfur concentration signal indicating the estimated sulfur concentration as the sulfur concentration in the fuel.

14. The aftertreatment system of claim 8, wherein the controller is further configured to:

in response to the actual SCR catalytic conversion efficiency being less than a SCR catalytic conversion efficiency threshold, cause heating of the SCR catalyst to a temperature above a regeneration temperature of the SCR catalyst.

15. A controller based method for estimating a sulfur concentration of a fuel provided to an engine that combusts the fuel and generates an exhaust gas communicated to an aftertreatment system, the method comprising:

determining, by the controller, an actual SCR catalytic conversion efficiency of an SCR catalyst included in the aftertreatment system;

determining, by the controller, an estimated SCR catalytic conversion efficiency based on a test sulfur concentration selected by the controller;

in response to the estimated SCR catalytic conversion efficiency being within a predefined range, setting, by the controller, the test sulfur concentration as a determined sulfur concentration in the fuel; and generating, by the controller, a sulfur concentration signal indicating the determined sulfur concentration in the fuel.

16. The method of claim 15, wherein the estimated SCR catalytic conversion efficiency is determined by performing steps comprising:

determining, by the controller, an amount of a reductant inserted into the aftertreatment system;

selecting, by the controller, the test sulfur concentration;

determining, by the controller, an estimated cumulative sulfur poisoning level of an SCR catalyst included in the aftertreatment system based on the amount of the reductant inserted, a fueling amount of fuel inserted into the engine, an engine speed of the engine, the test sulfur concentration, a SCR catalyst bed temperature of the SCR catalyst, a SCR catalyst sulfur loading capacity, and an oxidation catalyst bed temperature of an oxidation catalyst included in the aftertreatment system; and determining the estimated SCR catalytic conversion efficiency, by the controller, based on at least the estimated cumulative sulfur poisoning level and the SCR catalyst bed temperature.

17. The method of claim 16, wherein the estimated cumulative sulfur poisoning level is estimated by performing steps comprising:

determining, by the controller, an estimated sulfur exposure level of the SCR catalyst based on the fueling amount, the engine speed, and the test sulfur concentration;

determining, by the controller, an estimated sulfur slip from the oxidation catalyst, a $SO_2/SO_3$ fraction based on the sulfur exposure level, the oxidation catalyst bed temperature, and a sulfur storage capacity of the oxidation catalyst;

determining, by the controller, an estimated ammonium bisulfate (ABS) loading of the SCR catalyst and a first $SO_2$ release level from the SCR catalyst corresponding to the ABS loading based on the estimated sulfur slip, the $SO_2/SO_3$ fraction, the amount of reductant inserted, and the SCR catalyst bed temperature;

determining, by the controller, an estimated chemical poisoning of the SCR catalyst and a second $SO_2$ release level from the SCR catalyst corresponding to the chemical poisoning based on the estimated sulfur slip, the $SO_2/SO_3$ fraction, the SCR catalyst bed temperature, and a SCR catalyst sulfur storage capacity; and determining the estimated cumulative sulfur poisoning level of the SCR catalyst, by the controller, based on the ABS loading, the first $SO_2$ release level, the chemical poisoning, and the second $SO_2$ release level.

18. The method of claim 16, wherein the test sulfur concentration is a first test sulfur concentration, and wherein the method further comprises:

in response to the estimated SCR catalytic conversion efficiency being outside the predefined range, determining, by the controller, the estimated cumulative sulfur poisoning level of the SCR catalyst based on a second test sulfur concentration different from the first test sulfur concentration.

19. The method of claim 15, further comprising:

in response to the estimated SCR catalytic conversion efficiency being within the predefined range, determining, by the controller, a difference between the estimated SCR catalytic conversion efficiency and the actual SCR catalytic conversion efficiency;

determining, by the controller, an estimated sulfur concentration in the fuel based on the test sulfur concentration and the difference;

generating, by the controller, a second sulfur concentration signal indicating the estimated sulfur concentration as the sulfur concentration in the fuel.

20. The method of claim 15, further comprising:

in response to the actual SCR catalytic conversion efficiency being less than a SCR catalytic conversion efficiency threshold, cause heating of the SCR catalyst, by the controller, to a temperature above a regeneration temperature of the SCR catalyst.

* * * * *